United States Patent [19]  [11] 4,156,808
Bardeau  [45] May 29, 1979

[54] HEATED COOKING UTENSILS

[76] Inventor: William M. Bardeau, 33 Harbour Sq., Ste. 3218, Toronto, Ontario, Canada, M5J 2G2

[21] Appl. No.: 870,179

[22] Filed: Jan. 17, 1978

[30] Foreign Application Priority Data

Jan. 9, 1978 [CA] Canada .................................. 294594

[51] Int. Cl.² ........................................... F27D 11/02
[52] U.S. Cl. .................................. 219/439; 219/441; 219/430; 219/438; 219/449; 219/530
[58] Field of Search .............. 219/430, 438, 439, 441, 219/442, 449, 461, 462, 530, 540; 99/425; 165/104, 183; 126/126, 400

[56] References Cited

U.S. PATENT DOCUMENTS

| 2,691,717 | 10/1954 | Huck | 219/462 |
|---|---|---|---|
| 2,932,718 | 4/1960 | Marsters | 219/530 X |
| 3,010,006 | 11/1961 | Schwaneke | 219/442 |
| 3,085,144 | 4/1963 | Bate | 219/530 |
| 3,831,002 | 8/1974 | Mysicka et al. | 219/439 X |
| 4,024,377 | 5/1977 | Henke | 219/439 |
| 4,045,654 | 8/1977 | Eide | 219/449 |

Primary Examiner—Volodymyr Y. Mayewsky

[57] ABSTRACT

A cooking utensil that includes the combination of a heat transmitting metal bottom wall, preferably stainless steel with a heat generating source including a high heat-conductive metal body, preferably aluminum, the bottom wall having a substantially planar lower surface and said high heat-conductive metal body presenting a flat surface to the lower surface of the bottom wall, a plurality of releasable clamping devices carried by the bottom wall and projecting therebelow generally peripherally of the high heat-conductive metal body at spaced intervals therearound each clamping device including a threaded post and nut threadably engageable therewith and including a resilient washer for engaging and urging the metal body upwardly into full resilient abutment with the lower surface of the bottom wall and a releasable rigid support formation carried by the margins of the bottom wall to embrace and engage the metal body from below to bear upwardly thereagainst over the range of applied temperatures to thereby constrain the metal body against the bottom wall throughout the area of abutment to minimize distortion or warping of the bottom wall.

14 Claims, 4 Drawing Figures

HEATED COOKING UTENSILS

This invention relates to improvements in heated cooking utensils and particularly to utensils of larger capacity such as commercial frying pans and skillets.

One principal object of the invention is to provide a frying pan or skillet which utilizes heat energy more efficiently and particularly over the broad expanse of the larger heated surface of units of the type mentioned.

Another object is to provide a simplified cooking utensil structure whose principal components can be fabricated in accordance with known procedures using conventional equipment so as to reduce both material and labour costs.

Still another important object is to lighten the weight of such utensils, particularly in the range of the larger capacity units without sacrificing strength which not only reduces the cost of materials but facilitates handling, installation, maintenance and repair.

Still other important objects are to provide a cooking utensil in which the temperature of the heated surface of the vessel portion can be more closely monitored and controlled and in which the components for generating the heat, while protected from unintentional contact as well as from the atmosphere, can be readily exposed for inspection, repair or replacement.

Still another important object is to provide a cooking utensil whose surfaces to be cleaned or scoured are smoothly contoured to facilitate such activity and whose overall configuration is designed to be both functional and attractive whereby substantially all requirements expected of such unit are satisfied and particularly when it is to be used in commercial establishments.

According to the invention the heat generating source for a heated cooking utensil which is adapted to be heated from below is provided in the form of a unit or a series of units each including a suitable heat conductive metallic body, the heat transmitting metallic bottom wall of the utensil having a substantially uniform thickness throughout and a substantially planar lower surface, the metallic body presenting a substantially flat surface to the lower surface of the metallic bottom wall so as to establish maximum uninterrupted area of contact upon being resiliently urged into abutment therewith from below, the utensil being provided with a plurality of clamping devices carried by the bottom wall and located generally peripherally of the metallic body and engageable with the metallic body so as to urge same resiliently upwardly to establish and maintain full abutment between the opposed surfaces of contact over the range of applied temperatures.

Still another feature of the invention resides in providing a releasable rigid support structure to be carried by the bottom wall from opposed margins and extending therebelow to embrace and engage the heat-conductive metallic body to bear upwardly thereagainst over the range of applied temperatures to thereby constrain the body against the wall throughout the area of abutment to maintain orientation of the bottom wall in the planar disposition.

More particularly according to the invention, in cooking utensils of large capacity the heat generating source will take the form of two or more heat-conductive metallic bodies of like configuration and capacity, which bodies placed together in side-by-side relation reflect closely the overall dimensions of the expansive bottom wall of the utensil so as to establish requisite coverage of same for substantially uniform heat transmission, but with the bodies spaced slightly apart to accommodate expansion and contraction over the range of applied temperatures.

In such arrangement each of the metallic bodies is supported against separation by means of the clamping devices carried by the bottom wall arranged generally peripherally of the metallic bodies and releasably rigid support structures included at spaced intervals to embrace and engage each of the spaced bodies from below and bridging the spacing therebetween to bear upwardly thereagainst over the range of applied temperatures and to thereby constrain the bodies against the bottom wall throughout their areas of abutment to maintain orientation of the bottom wall in planar disposition.

In accordance with known practice where a utensil is of larger capacity, the adoption of a relatively thick bottom may be necessary for strength. In that case particularly where mild steel or stainless steel or titanium is used in the fabrication of the vessel components, the side walls and end walls are of lesser thickness to save material and lessen the weight. This approach requires that the thicker bottom wall and side walls and end walls of lesser thickness be welded together along their abutting edges which include not only the corner edges but the entire perimetral edges of the bottom wall and bottom edges of both side and end walls.

Further all such welds must be ground and polished for appearance and cleanliness purposes, which is more time consuming and therefore more costly in labor.

By creating circumstances that allow for reduction in the thickness of the bottom wall of the vessel portion, particularly in the case of mild steel or stainless steel, the same thickness of metal plates can be used for the bottom wall as is used for the side and end walls thereby reducing the weight of material required and preserving the vessel strength by adopting the manner of heating and support described in earlier paragraphs.

Moreover, the vessel portion in its fabrication in the initial stages can be formed from a metal sheet simply by notching out the corners of the sheet in accordance with the layout of the vessel to define the integral bottom, side and end walls with vessel configuration completed by folding or bending up the side and end walls and joining only their corner abutting edges by welding with the grinding and polishing steps undertaken in the usual manner. With this alternative a substantial saving in both material and labor costs is achieved.

These and other objects and features will become apparent from the following description of a preferred embodiment which is to be read in a conjunction with the sheets of drawings in which, FIG. 1 is an exploded view in perspective of a cooking utensil embodying the invention taken from a point below the unit;

Figure 1:
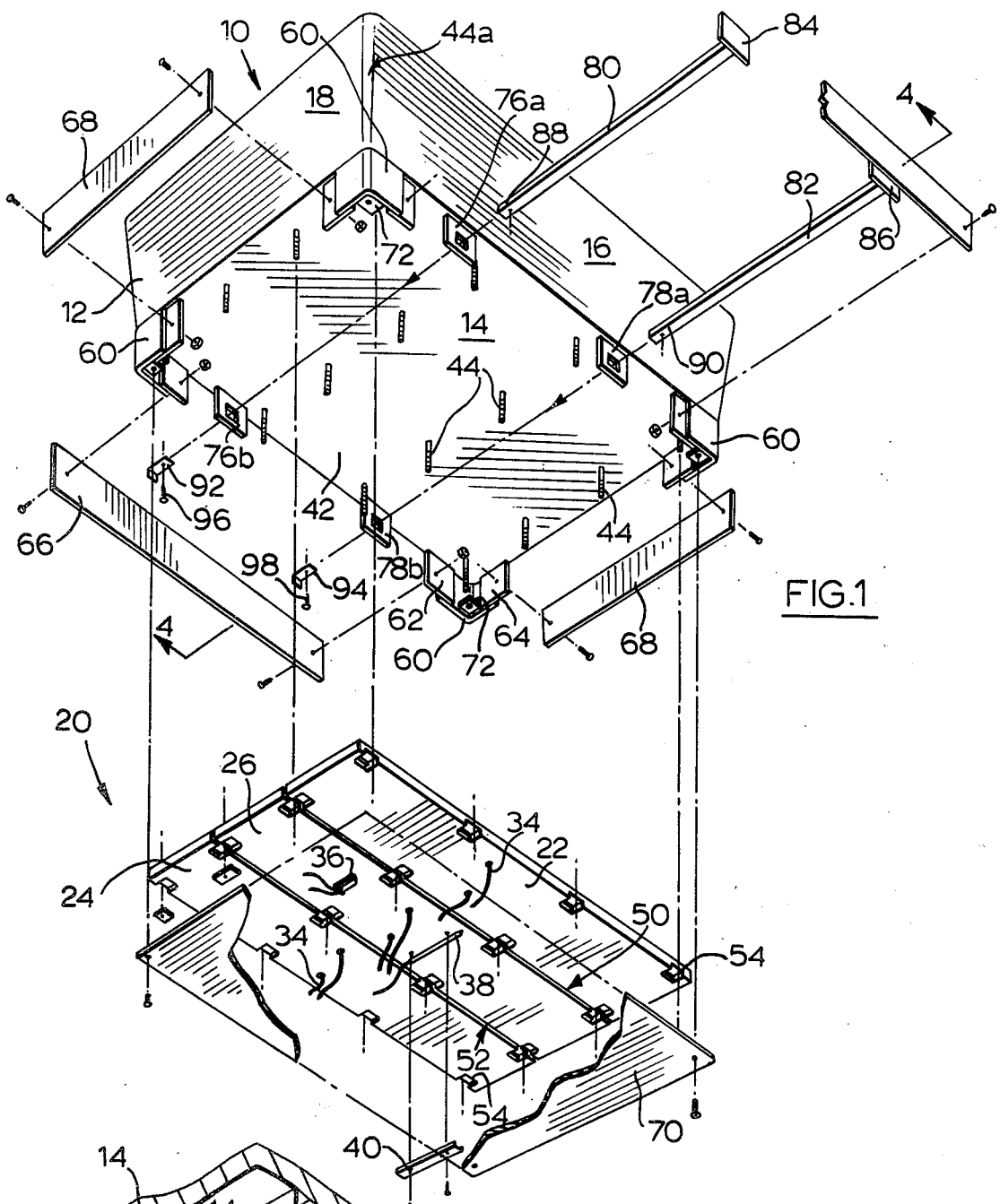

The cooking utensil 10 illustrated and described takes the form of a commercial frying pan or skillet. While the improvements embodied in such utensils are primarily intended for commercial units it is to be understood that the improvements can be included in all manner of appliances both commercial and domestic.

Utensil 10 as shown particularly in FIGS. 1 and 4 includes a receptacle or vessel portion 12 comprising a bottom wall 14, side walls 16 and end walls 18 which is adapted to receive heat transmitted through bottom wall 14 from below by means of a heat generating source generally designated 20 which source includes in the preferred embodiment illustrated three spaced apart like heat-conductive metallic bodies 22, 24 and 26 respectively.

Embedded in each heat-conductive metallic body are selected lengths of electrical resistance elements indicated at 32 in each metallic body and are arranged in a pattern therewithin so as to disseminate heat substantially uniformly throughout same in a manner that is well-known.

Through electrical leads generally indicated at 34 electrical resistance elements 32 are adapted to be connected in series to a source of electrical potential for energizing same, which circuitry also includes a thermostat which is adapted to be manually set by the operator of the utensil to the desired temperature which includes a thermal switch 36 responsive to a temperature sensing probe or monitor 38 adapted to be mounted centrally of and immediately below the lower surface of the central metallic body 26.

The probe 38 is preferably shielded from below by a suitable cover plate 40 therefore secured to body 26 by suitable fasteners.

Alternatively, if desired the heat conductive metallic bodies 22, 24, 26 can be heated from below by gas burners (not illustrated) which are designed to deliver the required units of heat to each metallic body for conduction therethrough and transmission by the bottom wall to the vessel contents, which gas burners use conventional equipment and controls and can be mounted for operation in accordance with known procedures.

Each metallic body is adapted to be releasably and resiliently clamped up against the lower surface 42 of bottom wall 14 in such manner as to most efficiently transmit the generated heat to bottom wall 14 and ultimately to the contents of vessel 12. With this arrangement substantially uniform temperatures within an acceptable selected range can be established across the broad expanse of the upper surface of bottom wall 14. Moreover the combination minimizes the likelihood of any hot spot developing in such bottom wall, which is at the same time the main supporting wall of vessel 12.

Bottom wall 14 in the embodiment described is made from stainless steel and has dimensions of the order of 17½ inches long, 24½ inches wide and has a thickness of the order of between ⅛ to 3/16 inches.

Bottom wall 14 is preferably integral with side walls 16 and end walls 18 and formed from the same metal sheet by notching the sheet at the corners to define the side and end walls and then folding them upwardly to their inclined positions welding the abutting corner edges together generally indicated at 44a which welds are then ground and polished to provide the requisite smoothness for purposes of appearance and cleanliness.

The depth of vessel 12 in such embodiment is of the order of 7 inches and will have a capacity of the order of 10 U.S. gallons.

The depth of such vessel can be reduced to 3½ inches to provide a vessel of 5 gallon capacity if so required.

Larger utensils constructed in accordance with the invention employ a bottom wall 34 inches long by 24½ inches wide and a thickness of the order of between ⅛ and 3/16 inches. With a 7 inch depth the rated capacity for such unit is 24 U.S. gallons and where required the depth can be increased to 9 inches to provide greater capacity of 29 U.S. gallons.

In contrast with the smaller unit which is illustrated and described herein, the heat required for the larger utensil is twice that of the smaller unit and therefore the larger unit employs six heat-conductive metallic bodies and associated heat sources instead of three.

The preferred metal for fabrication of vessel 12 is stainless steel but mild steel and titanium can be used. Also cast iron may be preferred for certain installations and known procedures can be followed in the manufacture of the vessel portion from cast iron.

Metallic bodies 22, 24 and 26 are preferably cast from aluminum which has a high coefficient of thermal conductivity but also may be cast from other metals of similar thermal conductivity suitable in the circumstances.

Each metallic body or casting in the preferred embodiment has the following approximate dimensions: 24½ inches long by 5¾ inches wide by 1¼ inches deep.

Further in the embodiment illustrated each electrical resistance element embedded in each metallic body will be selected from those having a high sheath temperature and of suitable diameter of the order of 5/16 inches which will yield from 2,500 watts to 3,000 watts depending on the available voltage i.e. 208 volts or 230 volts so that the total available energy is in the range of between 7,500 to 9,000 watts for the smaller unit.

The larger unit in comparison will provide from between 15,000 watts to 18,000 watts depending upon the voltage.

Lower surface 42 of bottom wall 14 is substantially planar. In order to establish maximum area contact between bottom wall 14 and the several metallic bodies 22, 24 and 26 their upper surfaces are flattened after they are cast to remove any protuberance.

Depending below lower surface 42 of bottom wall 14 and welded thereto are a number of threaded steel studs or posts 44 of 5/16 inch diameter arranged in a pattern such that they depend peripherally of each metallic body 22, 24 and 26 and serve together with steel nuts 46 and resilient stainless steel washers 48a and 48b as resilient releasable clamps for urging the flat surfaces of heat-conductive metallic bodies 22, 24 and 26 against the planar lower surface 42 of bottom wall 14.

Figures 2, 3:
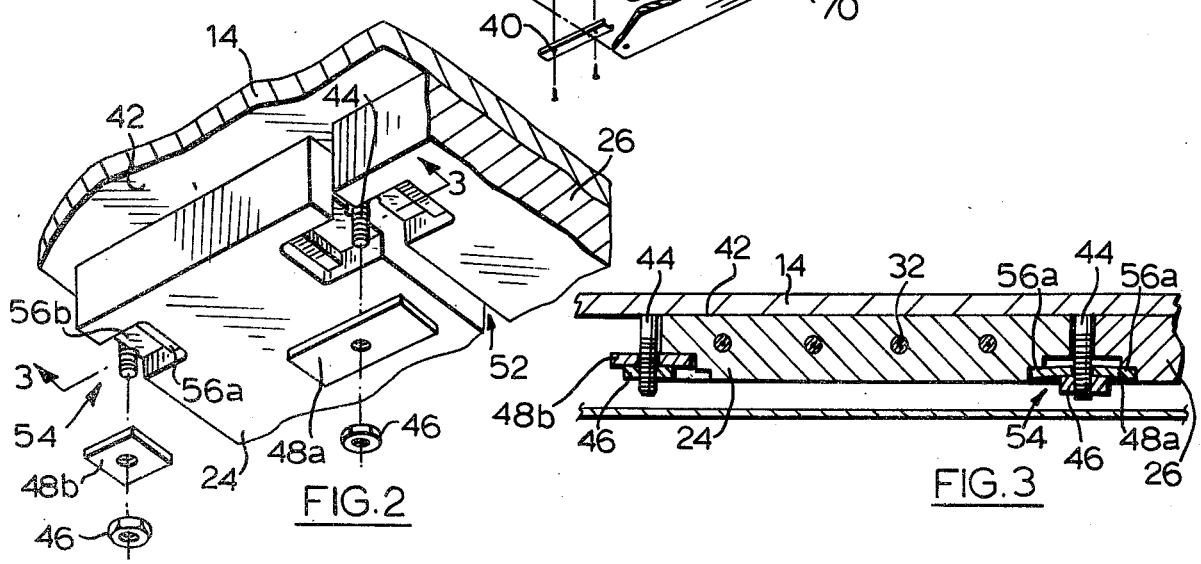
FIG. 2 is an enlarged view in perspective of a corner section of the utensil of FIG. 1 showing the relationship of the bottom wall of the vessel portion and the heat-conductive metal body and a manner of releasably and resiliently securing same together.
FIG. 3 is a vertical cross-sectional view of that portion of the utensil illustrated in FIG. 2 taken along the lines 3—3 of FIG. 2.

It will be observed in FIGS. 1, 2 and 3 that gaps of the order of between 1/32 of an inch to 3/32 of an inch may be provided between adjacent heat-conductive metal bodies 22 and 26 and 24 and 26 as at 50 and 52. These gaps accommodate expansion and contraction of the cast aluminum blocks or metallic blocks over the range of applied temperatures.

Each heat-conductive metal body is provided with a series of peripherally located recesses 54 suitably shaped centrally in part circular configuration as seen in FIGS. 2 and 3 to receive therewithin the threaded studs or posts 44.

Recesses 54 are also provided with a stepped configuration to present a shoulder 56a and a bottom wall 56b.

According to the invention recesses 54 of adjacent metallic bodies 22, 26 and 24, 26 upon assembly of components as illustrated in FIG. 1 will be in alignment as shown in FIGS. 2 and 3 when placed side by side below bottom wall 42 with opposed recesses 54 presenting spaced shoulders 56a against which the ends of resilient steel washers 48a bear upwardly.

In accordance with this arrangement upon turning of the steel nuts 46 to move upwardly against steel washers 48a upon threaded post 44 forces are imparted to the resilient washers 48 centrally to distort same upwardly in the manner illustrated in FIG. 3 which generates a strong reactive force upwardly against each spaced shoulder formation 56a whereby full abutment of the flat surfaces of metallic bodies 22, 24 and 26 with planar lower surfaces 42 of bottom wall 14 is established throughout the critical central area thereof and is maintained over the range of applied temperatures.

Peripherally the heat conductive metallic bodies are securely resiliently anchored by steel nuts 46 turned upwardly against resilient steel washers 48b which bear against the bottom walls 56b of peripheral recesses 54 to thereby establish full abutment of the aforementioned surfaces peripherally of the central area.

The resilient stainless steel washers 48a, 48b can also be fabricated to take a cupped configuration as distinguished from the rectilinear form illustrated, with the rim of the cup shaped washer extending upwardly.

Recesses 54 will be modified to present part circular shoulder formations against which part of the rim of the cup shaped washers will bear when such cup shaped washers are adapted to bridge the gap between adjacent metallic bodies 22, 26 and 24, 26.

With this arrangement the distortion of the central portion of the cup shaped washer produces the required resilient reactive forces necessary to establish the desired abutment of the aforementioned surfaces.

Further, alternatively, in relation to the required outer peripheral clamping of the metallic bodies, the bodies can be formed with apertures to present openings within the blocks to receive the threaded steel posts 44 which are surrounded by a circular recess presenting a circular shoulder formation corresponding in function to shoulder formations 56a of recesses 54 against which the rim of the cup shaped washer is adapted to bear under the compressive forces applied by the steel nuts 46 to exert the resilient reactive forces to establish the full abutment of the aforementioned surfaces peripherally of the central area.

Depending below lower surface 42 of bottom wall 14 at each corner and secured as by welding are angle pieces commonly designated 60 provided inwardly with longitudinally and transversely extending apertured plates commonly designated 62, 64 respectively also secured by welding which with respective corner pieces 60 define outer recesses or seats to receive opposed apertured ends of longitudinally and transversely extending removable side and end plates 66, 68 respectively.

The combination of corner pieces 60, abutting apertured plates 62, 64 together with removable side and end plates 66, 68 respectively, releasably secured by suitable fasteners, define a depending skirt or apron which together with a lower cover plate 70 is adapted to enclose or shield the heat-conductive metallic bodies 22, 24, 26 and associated circuitry and controls from accidental or unintentional contact or dislodgement. Further, such enclosure insulates those components from the atmosphere which aids in monitoring and controlling the heat to be transmitted to vessel 12.

Lower cover plate 70 is secured by providing corner pieces 60 with apertured lugs 72 extending inwardly within the contained angle thereof and spaced above the lower edges, so as to define locating recesses to receive and position the corners of plate 70 therewithin which are suitably apertured to correspond with the respective apertures of the lugs 72 so that plate 70 can be supported therefrom by releasably fasteners.

Mounted to extend downwardly from and aligned with the margins of bottom wall 14 inwardly of the side walls 16 are pairs of stainless steel apertured lugs 76a, 76b and 78a and 78b anchored to bottom wall 14 as by welding.

Adapted to releasably register within aligned apertures of depending pairs of lugs 76a, 76b, 78a and 78b are rigid supporting structures in the form of lengths of hollow steel tubing 80 and 82 preferably of square cross-section to embrace from below and abut upwardly against the lower surfaces of heat-conductive metallic bodies 22, 24 and 26 in the manner illustrated in FIGS. 1 and 4 of the drawings.

Metal plates 84 and 86 welded to the ends of lengths of hollow tubing 80 and 82 serve as stops for locating the steel tubing 80 and 82 below the heat-conductive metallic body and present opposed apertured ends 88 and 90 in registration within lugs 76b and 78b. Tubing 80, 82 are anchored in place by angle pieces 92, 94 releasably secured by fasteners 96, 98 to the ends remote from the stop plates 84, 86. Thus dislodgement of same is prevented except upon disassembly when required to replace or repair components of the enclosed heat generating source and circuitry.

Figure 4:
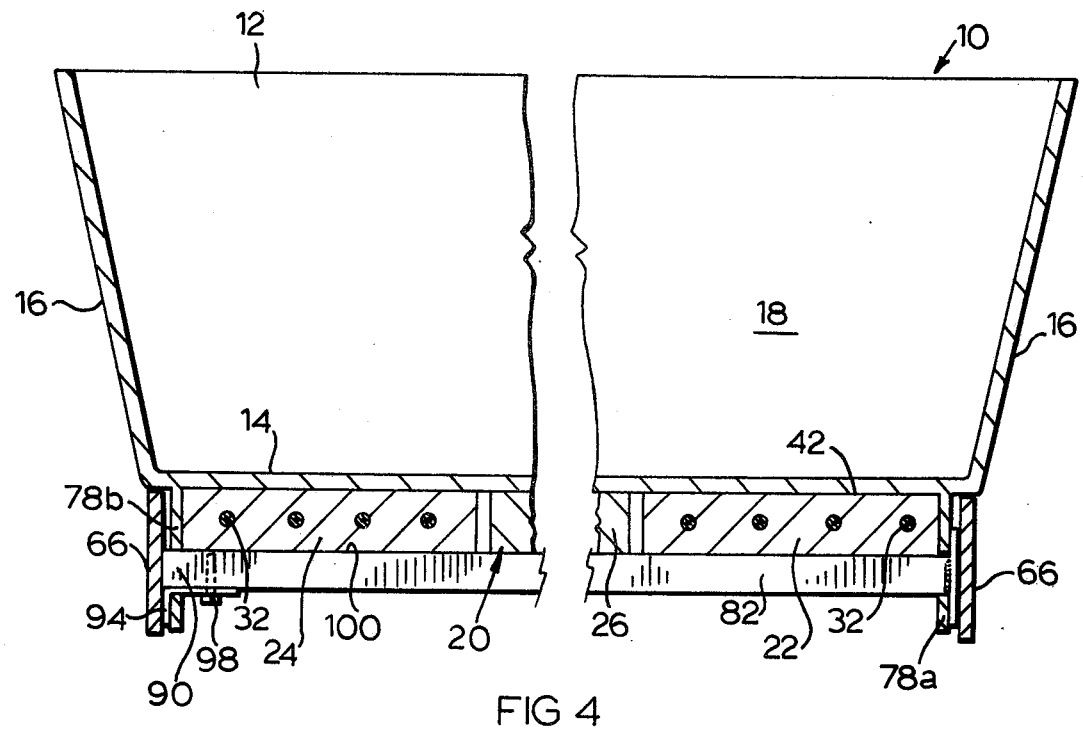
FIG. 4 is a vertical cross-sectional view partly broken away of the assembled cooking utensil of FIG. 1 taken along the lines 4—4 of FIG. 1.

It will be seen particularly in FIG. 4 that when tubing 82 is fully registered within spaced apertured lugs 78a, 78b and anchored therein the flat upper surface thereof bears tightly up against the flat lower surfaces of the respective metallic bodies 22, 24 and 26 and bridges the gaps 50, 52 therebetween.

By providing such rigid support formations in the form of hollow steel tubing bearing upwardly against the heat-conductive metallic bodies at requisite intervals and constraining same against bottom wall 14 of vessel 12 the planar orientation of bottom wall 14 will be maintained over the wide range of temperatures to be applied which has an upper limit of the order of 430° F.

It will be understood that the upper surfaces of metal tubing 80, 82 will be heated by the metallic bodies which will cause the upper portions of the metal tubing to extend or lengthen resulting in the tendency of the lengths of tubing to expand upwardly against the metallic bodies which generated forces applied through the bodies to bottom wall 14 minimize any distortion or warping.

It has been demonstrated that by placing a properly calibrated temperature sensing device or probe 38 centrally below the bank or grouping of heat-conductive metallic bodies clamped from below by channel member 40 control of the upper surface temperature of bottom wall 14 is enhanced so that a selected upper surface temperature can be maintained overall within a 25° F. variation.

The structure, components, circuitry and controls illustrated and described which embody the invention afford an improved frying pan or skillet which can be quickly heated to operating temperature and provide a more stable upper surface heating throughout the bottom wall expanse which gives rise to increased efficiency in heat transfer, shortened cooking times, and will conserve energy.

It is to be understood that modifications or variations may be undertaken by those skilled in the art in relation to the embodiment illustrated and described without departing from the spirit and scope of the invention as defined in the claims which follow.

What I claim is:

1. In a cooking utensil, the combination of a heat transmitting metal bottom wall with a high heat-conductive metal body and a heat source therefore, said wall having a substantially planar lower surface and said body presenting a flat surface to said lower surface of said wall, a plurality of releasable clamping devices carried by said wall and depending therebelow generally peripherally of said body at spaced intervals therearound, each said clamping device including displaceable resilient means for engaging and urging said body upwardly into full abutment with the lower surface of said wall and releasable rigid support means carried by said wall adjacent opposed margins thereof and extending therebelow to embrace and engage said body from below and to bear upwardly thereagainst over the range of applied temperatures to thereby constrain said body against said wall throughout the area of abutment to thereby maintain orientation of said wall in planar disposition.

2. A utensil according to claim 1 in which said heat generating source includes two or more high heat-conductive metal bodies of like dimensions and capacity, said flat surfaces of said metal bodies being arranged in side-by-side relation and having a spacing therebetween, said flat surfaces thereof reflecting substantially the overall dimensions of said wall, said releasable rigid support means carried by opposed margins of said wall embracing and engaging each of said spaced bodies from below and bridging the spacing therebetween to bear upwardly thereagainst over the range of applied temperatures.

3. A utensil according to claim 1 in which each releasable clamping device comprises a vertically depending threaded post, a threaded nut for threadably engaging said post from below and said displaceable resilient means comprises a resilient spring washer carried by said post and displaceable by said threaded nut upwardly into engagement with said body, said body being provided with recess means in the region of each depending threaded post for registration with each said resilient spring washer, each said recess means presenting a peripheral bearing surface formation to said resilient washer whereby under application of clamping forces exerted centrally of said resilient spring washer by said threaded nut engaging said threaded post, said body is resiliently urged upwardly into full abutment with said bottom wall.

4. A utensil according to claim 1 in which said each rigid support means includes a substantially rigid hollow metal tube extending from adjacent one margin of said bottom wall in spaced relation therebelow to the opposite margin of said bottom wall, means carried by said bottom wall at said respective margins for supporting said tube at each end thereof, and presenting the upper surface of said tube for engagement with said metallic body and means for releasably securing said tube to said marginal support means.

5. A utensil according to claim 1 in which said bottom wall is stainless steel and said heat-conductive metallic body is aluminum.

6. In an electrically heated cooking utensil the combination of a heat transmitting metal bottom wall with an electrical heat generating source including an electrical resistance element embedded in a high heat conductive metal body and electrically insulated therefrom, said wall having a substantially planar lower surface and said body presenting a flat surface to said lower surface of said wall, a plurality of releasable clamping devices carried by said wall and depending therebelow peripherally of said body at spaced intervals therearound, each said clamping device including displaceable resilient means for resiliently engaging and urging said body upwardly into full abutment with the lower surface of said wall, and releasable rigid support means carried by said wall and extending therebelow to embrace and engage said body from below and to bear upwardly thereagainst over the range of applied temperatures to thereby constrain said body against said wall throughout the area of abutment to maintain orientation of said bottom wall in planar disposition.

7. A utensil according to claim 6 in which said heat generating source includes two or more electrical resistance elements each embedded in a high heat-conductive metal body of like dimensions and capacity and each electrically insulated therefrom, said flat surfaces of said metal bodies being arranged in side-by-side relation and having a spacing therebetween said flat surfaces thereof reflecting substantially the overall dimensions of the bottom wall, said releasable rigid support means carried by said wall embracing and engaging each of said spaced bodies from below and bridging the spacing therebetween to bear upwardly thereagainst over the range of applied temperatures.

8. A utensil according to claim 6 in which each releasable clamping device comprises a vertically depending threaded post, a threaded nut for threadably engaging said post from below and said displaceable resilient means comprises a resilient spring washer carried by said post and displaceable by said threaded nut upwardly into engagement with said body, said body being provided with recess means in the region of each depending threaded post for registration with each said resilient spring washer, each said recess means presenting a peripheral bearing surface formation to said resilient washer whereby under application of clamping forces exerted centrally of said resilient spring washer by said threaded nut engaging said threaded post, said body is resiliently urged upwardly into full abutment with said bottom wall.

9. A utensil according to claim 6 in which said each rigid support means includes a substantially rigid hollow metal tube extending from adjacent one margin of said bottom wall in spaced relation therebelow to the opposite margin of said bottom wall, means carried by said bottom wall at said respective margins for supporting said tube at each end thereof, and presenting the upper surface of said tube for engagement with said metallic body and means for releasably securing said tube to said marginal support means.

10. A utensil according to claim 6 in which said bottom wall is stainless steel and said heat-conductive metallic body is aluminum.

11. A utensil according to claim 6 in which said bottom wall is stainless steel of substantially uniform thickness throughout and said heat-conductive metal body is aluminum of substantially uniform thickness throughout.

12. In a cooking utensil the combination of a stainless steel metal bottom wall of substantially uniform thickness throughout with two or more high heat conductive metal bodies of aluminum of like configuration and capacity and a heat source for each said aluminum metal body, the heat transmitting bottom wall having a substantially uniform thickness throughout and a substantially planar lower surface, each metal body presenting a substantially flat surface to the lower surface of the bottom wall and arranged in side-by-side relation and having a spacing therebetween so as to establish maximum uninterrupted area of contact upon each being resiliently urged into abutment therewith from below, a plurality of releasable clamping devices carried by said bottom wall and depending therefrom generally peripherally of each said bodies at spaced intervals therearound, each said clamping device including displaceable resilient means for resiliently engaging and urging said bodies upwardly into full abutment with said bottom wall and a plurality of spaced releasable rigid support means carried by said bottom wall to embrace and to bridge the spacing therebetween and engage said bodies from below and to bear upwardly thereagainst over the range of applied temperatures to thereby constrain said bodies against said bottom wall throughout the area of abutment to thereby maintain orientation of said wall in planar disposition.

13. A utensil according to claim 12 in which each releasable clamping device comprises a vertically depending threaded post, a threaded nut for threadably engaging said post from below and said displaceable resilient means comprises a resilient spring washer carried by said post and displaceable by said threaded nut upwardly into engagement with said body, said body being provided with recess means in the region of each depending threaded post for registration with each said resilient spring washer, each said recess means presenting a peripheral bearing surface formation to said resilient washer whereby under application of clamping forces exerted centrally of said resilient spring washer by said threaded nut engaging said threaded post, said body is resiliently urged upwardly into full abutment with said bottom wall.

14. A utensil according to claim 12 in which said each rigid support means includes a substantially rigid hollow metal tube extending from adjacent one margin of said bottom wall in spaced relation therebelow to the opposite margin of said bottom wall, means carried by said bottom wall at said respective margins for supporting said tube at each end thereof, and presenting the upper surface of said tube for engagement with said metallic bodies and means for releasably securing said tube to said marginal support means.

* * * * *